(12) United States Patent
Sukegawa et al.

(10) Patent No.: US 7,899,000 B2
(45) Date of Patent: Mar. 1, 2011

(54) COMMUNICATION METHOD, COMMUNICATION SYSTEM, AND COMMUNICATION APPARATUS

(75) Inventors: Katsuhiko Sukegawa, Tama (JP); Youichi Kimura, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 602 days.

(21) Appl. No.: 11/703,354

(22) Filed: Feb. 7, 2007

(65) Prior Publication Data
US 2007/0188339 A1    Aug. 16, 2007

(30) Foreign Application Priority Data
Feb. 15, 2006   (JP) .............................. 2006-038664

(51) Int. Cl.
*H04B 7/14* (2006.01)
(52) U.S. Cl. ........................ 370/315; 340/10.2; 455/574
(58) Field of Classification Search ........................ None
See application file for complete search history.

(56) References Cited

U.S. PATENT DOCUMENTS

| | | | |
|---|---|---|---|
| 6,118,980 A | | 9/2000 | Dorenbosch |
| 6,690,263 B1 * | | 2/2004 | Grieu .......................... 340/10.4 |
| 2007/0109099 A1 * | | 5/2007 | Raphaeli et al. ............ 340/10.2 |
| 2007/0126555 A1 * | | 6/2007 | Bandy ........................ 340/10.2 |

FOREIGN PATENT DOCUMENTS

| | | | |
|---|---|---|---|
| EP | 553905 A1 * | 8/1993 |
| JP | 9-138892 | 5/1997 |
| JP | 2002-109177 | 4/2002 |
| JP | 2002-304673 | 10/2002 |
| JP | 2004-265196 | 9/2004 |
| JP | 2005-99888 | 4/2005 |

* cited by examiner

*Primary Examiner*—Erika A Gary
(74) *Attorney, Agent, or Firm*—Ladas & Parry LLP

(57) ABSTRACT

There is disclosed a communication method of a communication system having a base station for performing a call and a terminal for returning a response to the call from the base station, the communication method including the steps of: transmitting the call by the base station, the call including response probability; and responding to the base station by the terminal based on the response probability when the call from the base station is received.

3 Claims, 6 Drawing Sheets

COMMUNICATION METHOD, COMMUNICATION SYSTEM, AND COMMUNICATION APPARATUS

CROSS REFERENCES TO RELATED APPLICATION

The present application claims priority under 35 U.S.C. §119(a) to Japanese application number 2006-038664, filed on Feb. 15, 2006, in the Japan Patent Office, which is incorporated herein by reference to its entirety as forth in full.

BACKGROUND OF THE INVENTION

1. Field of the Invention

The present invention generally relates to a communication method, a communication system, and a communication apparatus and particularly to a communication method, a communication system, and a communication apparatus having a base station for calling and a terminal for returning a response to the calling from the base station.

2. Description of the Related Art

In an electronic shelf label system, an electronic shelf label having rewritable display information is registered in a host computer and then attached to a product shelf. It is possible to rewrite the display information of the electronic shelf label from the host computer by accessing the electronic shelf label through an access point (refer to Patent Documents 1 to 5).

Such an electronic shelf label system employs a communication system in which a communication channel for communication between the electronic shelf label and an access point is determined using a beacon. For example, in CSMA/CA employed in IEEE 802.11b and the like, each terminal performs carrier sensing so as to confirm that a radio channel is continuously available for a certain period of time (random) and then transmits data. In accordance with this, collision is avoided.

Patent Document 1: Japanese Laid-Open Patent Application No. 2002-304673

Patent Document 2: Japanese Laid-Open Patent Application No. 2005-99888

Patent Document 3: Japanese Laid-Open Patent Application No. 2002-109177

Patent Document 4: Japanese Laid-Open Patent Application No. 2004-265196

Patent Document 5: Japanese Laid-Open Patent Application No. 9-138892

In view of this, a conventional method has a problem in that when the number of terminals is very large or when an amount of data transmitted by the terminal is very small, each terminal stands by while performing carrier sensing for a longer period of time in comparison with a period of actual data transmission, so that this is inefficient in terms power saving, for example.

SUMMARY OF THE INVENTION

It is a general object of the present invention to provide an improved and useful communication method, communication system, and communication apparatus in which the above-mentioned problems are eliminated.

A more specific object of the present invention is to provide a communication method, communication system, and communication apparatus that can perform communication in an efficient manner.

According to one aspect of the present invention, there is provided a communication method of a communication system having a base station for performing a call and a terminal for returning a response to the call from the base station, the communication method including the steps of: transmitting the call by the base station, the call including response probability; and responding to the base station by the terminal based on the response probability when the call from the base station is received.

According to another aspect of the present invention, in the communication method, when the terminal decides to make a response based on the response probability, the terminal determines time for the response in a random manner.

According to another aspect of the present invention, there is provided a communication system including: a base station for performing a call; and a terminal for returning a response to the call from the base station, wherein the base station transmits the call including response probability, and the terminal makes a response to the base station based on the response probability when the terminal receives the call from the base station.

According to another aspect of the present invention, in the communication system, when the terminal decides to make a response based on the response probability, the terminal sets a time slot as time for the response in a random manner.

According to another aspect of the present invention, there is provided a communication apparatus for performing a call to a terminal and receiving a response from the terminal, the communication apparatus including: a response probability setting unit setting response probability on the terminal; and a call unit transmitting the call including the response probability set by the response probability setting unit.

According to another aspect of the present invention, the communication includes: a communication probability setting unit controlling communication probability in accordance with a status of a communication channel.

According to another aspect of the present invention, there is provided a communication apparatus for returning a response to a call from a base station, the communication apparatus including: a response decision unit deciding whether to make a response to the base station based on response probability included in the call; and a response unit returning a response to the base station based on a decision by the response decision unit.

According to the present invention, the base station transmits a call including response probability and the terminal makes a response to the base station based on the response probability included in the call when the terminal receives the call from the base station. Thus, it is possible to control probability of collision of responses of terminals, so that it is possible to prevent the collision of responses. In accordance with this, unnecessary communication is reduced, so that it is possible to reduce power consumption.

Other objects, features and advantage of the present invention will become more apparent from the following detailed description when read in conjunction with the accompanying drawings.

DETAILED DESCRIPTION OF THE PREFERRED EMBODIMENTS

System Configuration

Figure 1:
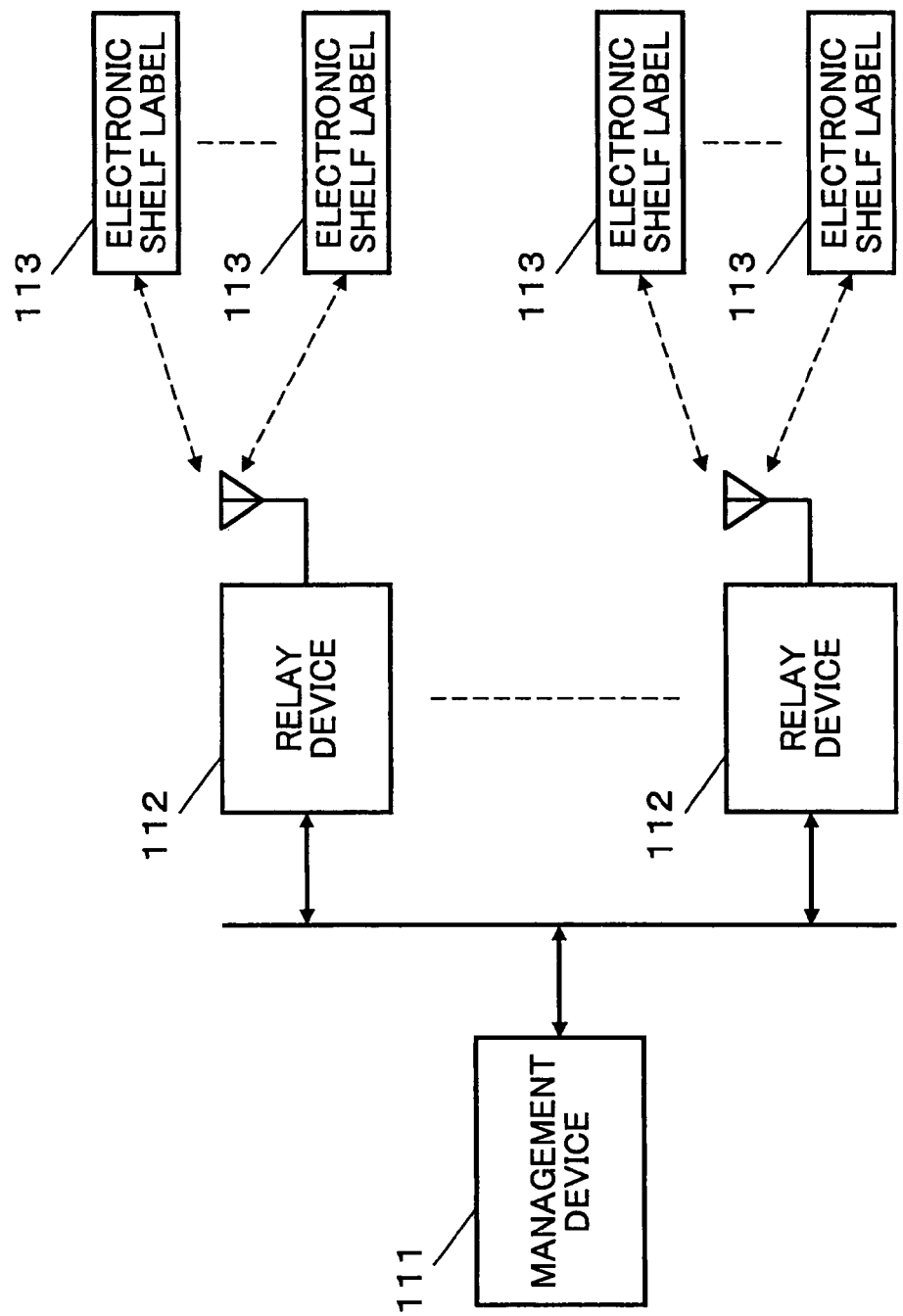
FIG. 1 is a configuration diagram of an example of a system according to the present invention.

FIG. 1 is a configuration diagram of an example of a system according to the present invention.

An electronic shelf label system 100 according to the example includes a management device 111, a relay device 112, and an electronic shelf label 113. The electronic shelf label system 100 has the relay device 112 for relaying communication between the electronic shelf label 113 and the management device 111 managing the electronic shelf label 113 and manages the electronic shelf label 113 attached to a product shelf.

[Relay Device]

Figure 2:
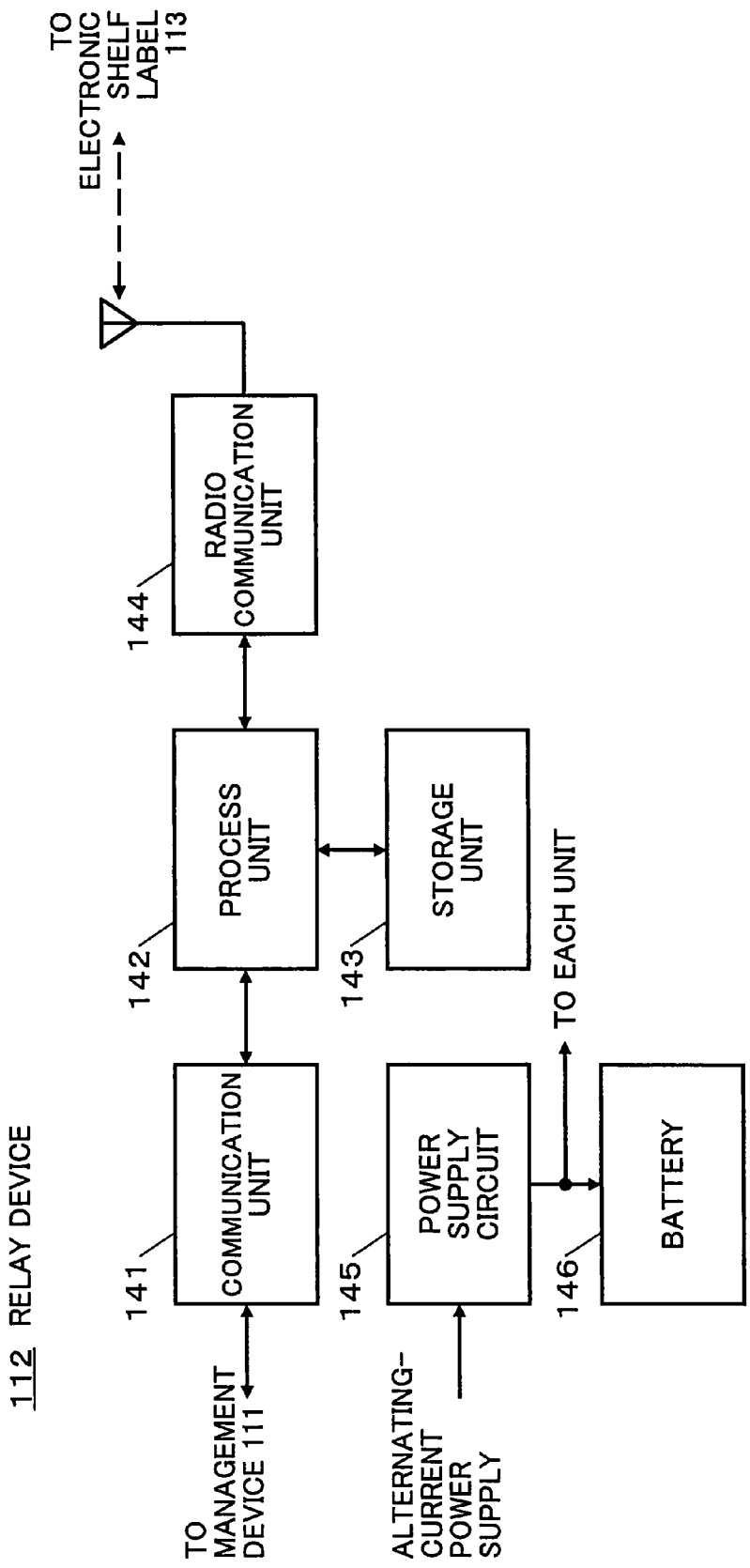
FIG. 2 is a block diagram of a relay device.

FIG. 2 is a block diagram of the relay device 112.

The relay device 112 includes a communication unit 141, a process unit 142, a storage unit 143, a radio communication unit 144, a power supply circuit 145, and a battery 146.

The communication unit 141 is connected to the management device 111 via a network such as LAN, WAN, a dedicated line, or the like. The communication unit 141 performs communication with the management device 111.

The process unit 142 includes a microcomputer and the like and performs a process for relaying communication, for example, between the management device 111 and the electronic shelf label 113 based on a program installed on the storage unit 143.

The storage unit 143 includes a rewritable non-volatile memory such as EEPROM, for example, ROM, RAM, and the like. In the storage unit 143, information 131 on electronic shelf labels within a communication range is stored in addition to a communication control program.

The radio communication unit 144 performs radio communication with the electronic shelf label 113.

The power supply circuit 145 is connected to an alternating-current power supply such as an external commercial power supply. The power supply circuit 145 converts the connected alternating-current power into a direct-current voltage and supplies the direct-current voltage as a driving voltage to the communication unit 141, the process unit 142, the storage unit 143, and the radio communication unit 144.

The battery 146 includes a Ni—Cd battery, a lithium ion battery, an electric double layer capacitor, or the like as a chargeable battery unit. The battery 146 is charged from the direct-current voltage generated in the power supply circuit 145 and supplies electric power for driving the communication unit 141, the process unit 142, the storage unit 143, and the radio communication unit 144 for a certain period of time so as to execute an end program when alternating-current power is cut.

[Electronic Shelf Label]

Figure 3:
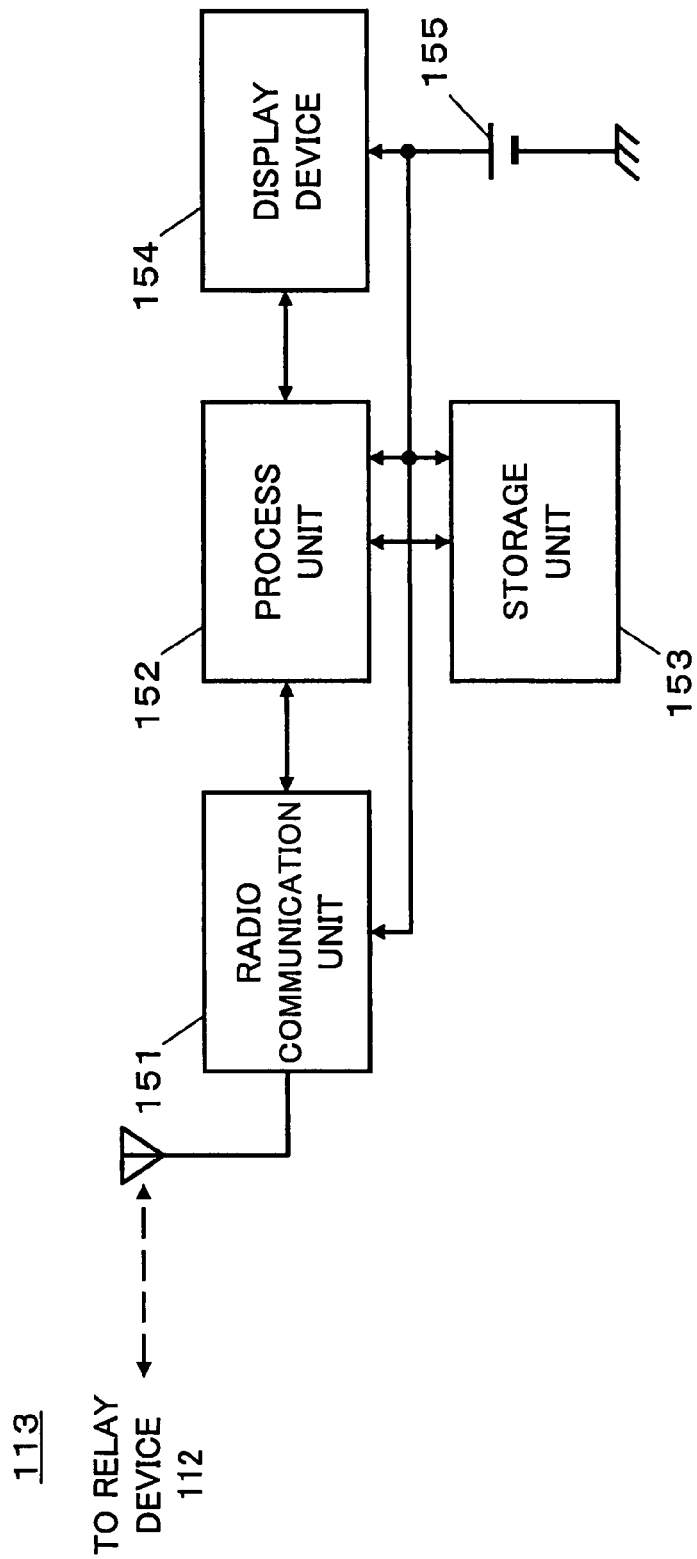
FIG. 3 is a block diagram of an electronic shelf label.

FIG. 3 is a block diagram of the electronic shelf label 113.

The electronic shelf label 113 includes a radio communication unit 151, a process unit 152, a storage unit 153, a display device 154, and a battery 155.

The radio communication unit 151 performs radio communication with the relay device 112.

The process unit 152 includes CPU, for example. The process unit 152 controls communication with the relay device 112 and also controls display of the display device 154 based on a program stored in the storage unit 153.

The storage unit 153 includes a rewritable non-volatile storage device such as EEPROM, for example. In the storage unit 153, a program executed in the process unit 152 is installed and shelf label IDs and product codes are stored. Some of the shelf label IDs and product codes are registered in advance and can be changed by the relay device 112.

The display device 154 includes LCD, an EL panel, electronic paper, or the like. The display device 154 displays product names, product codes, prices and the like.

The battery 155 includes a small battery and supplies electric power for driving the radio communication unit 151, the process unit 152, the storage unit 153, and the display device 154.

First, status transition of the electronic shelf label 113 from an unregistered status to a normal operation status is described.

The electronic shelf label 113 has three statuses, namely, an ID assignment waiting status where an ID is not assigned from the relay device 112, an ID registration waiting status where the ID assigned from the relay device 112 is not registered in the management device 111, and a normal status where the ID is registered in the management device 111.

In the following, a transition process from the ID assignment waiting status to the ID registration waiting status is described. A transition process from the ID registration waiting status to the normal status is omitted since this is the same process as the transition process from the ID assignment waiting status to the ID registration waiting status.

[Operation]

First, a call process of the relay device 112 is described.

Figure 4:
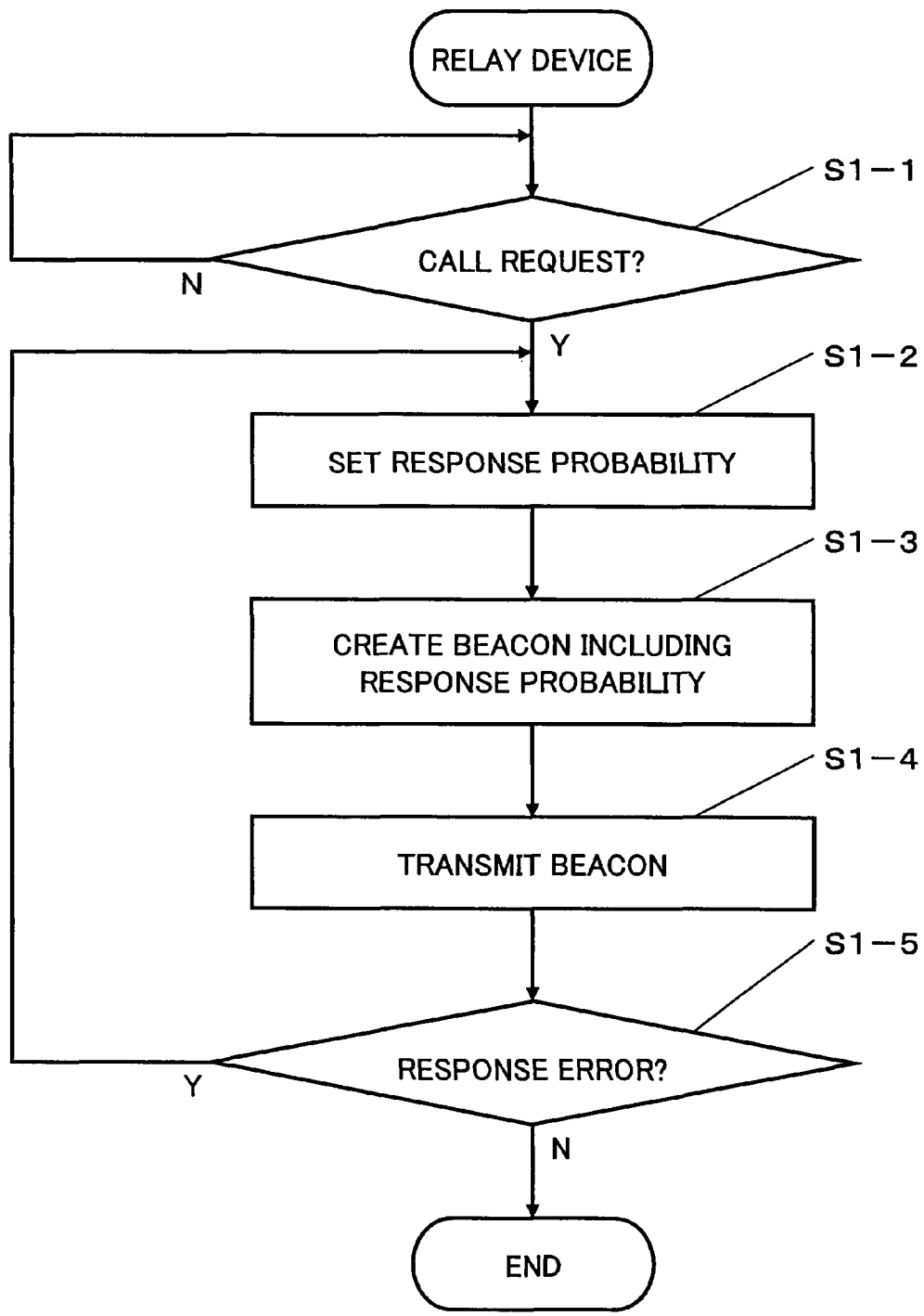
FIG. 4 is a process flow chart of a call process operation of a relay device.

FIG. 4 is a process flow chart of a call process of the relay device 112.

When a call request is generated in step S1-1 so as to assign an ID to the unregistered electronic shelf label 113, for example, the process unit 142 of the relay device 112 sets response probability to the call in step S1-2.

Next, the process unit 142 generates a beacon for calling including the response probability in step S1-3 and transmits the beacon via the radio communication unit 144 in step S1-4.

When a response from the electronic shelf label 113 is an error in step S1-5, the process of the process unit 142 returns to step S1-2. In the response probability setting process in step S1-2, when the response probability is reset due to errors and the like, a process for reducing the response probability from 50% to 30%, for example, is performed.

Next, a response process in the electronic shelf label 113 is described.

Figure 5:
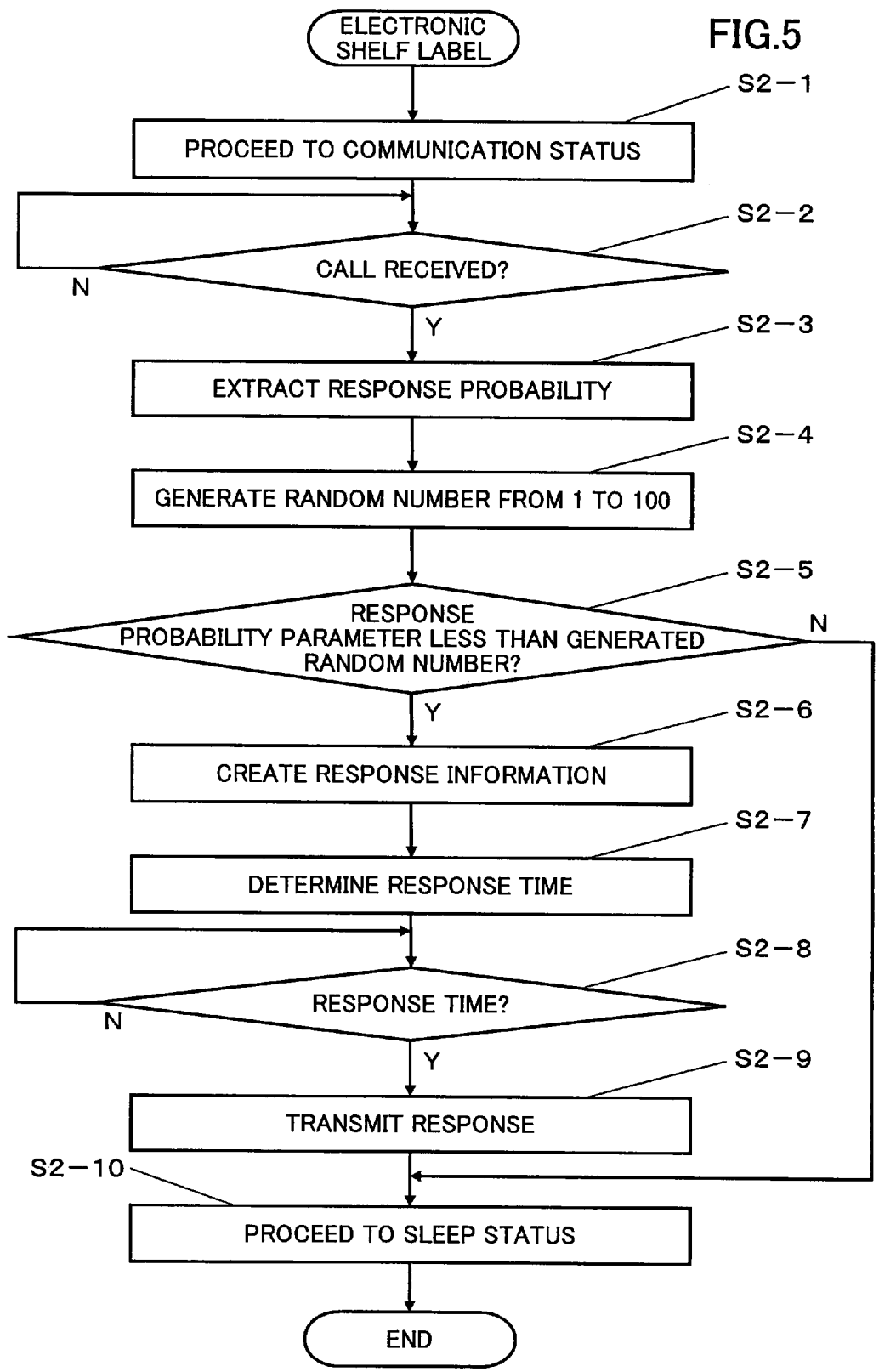
FIG. 5 is a process flow chart of a response process operation of an electronic shelf label.

FIG. 5 is a process flow chart of a response process of the electronic shelf label 113.

The process unit 152 of the electronic shelf label 113 shifts from a sleep status to a communication status in step S2-1. When the calling of the beacon from the relay device 112 is received in step S2-2, the process unit 152 extracts the response probability included in the received beacon in step S2-3.

The process unit 152 generates a random number from 1 to 100 in step S2-4 and compares the generated random number with a response probability parameter of the extracted response probability in step S2-5. The response probability parameter is set such that when the extracted response probability is 100%, a response must be made and when the extracted response probability is 50%, a response is made with a probability of 50%.

The process unit 152 compares the response probability parameter with the generated random number in step S2-5. When the response probability parameter is less than the generated random number in step S2-5, the process unit 152 decides to respond to the relay device 112 and creates response information in accordance with the call in step S2-6. Further, the process unit 152 determines a response time in step S2-7. The response time is determined by generating a random number and the like and determining the number of a communication slot inserted into a contended access period in accordance with the generated random number.

Figure 6:
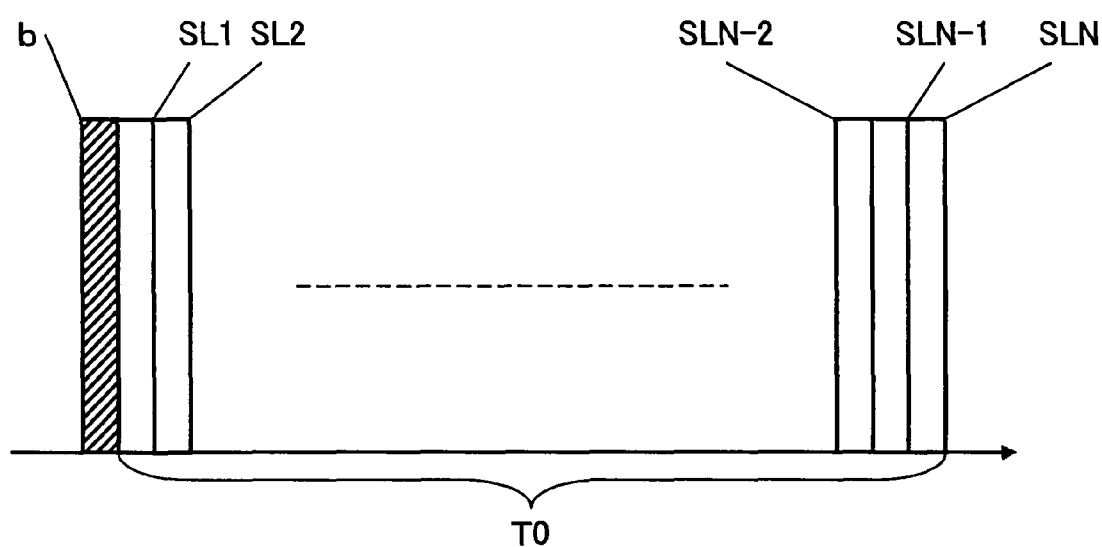
FIG. 6 is a diagram illustrating a response time determination operation.

FIG. 6 is a diagram illustrating a response time determination operation. In FIG. 6, a horizontal axis indicates time. In this case, after a beacon b for calling is transmitted, a contended access period T0 is set. In the contended access period T0, N communication slots SL1 to SLN are set. The process unit 152 selects one communication slot SLi in a random manner from the communication slots SL1 to SLN in accordance with the random number for example.

At a response time in step S2-8, namely, time of the selected communication slot SLi, the process unit 152 transmits the created response in step S2-9. When the transmission of the response is finished, the process unit 152 shifts to a sleep status in step S2-10. In the sleep status, only minimum necessary circuits are in operation and operations of unnecessary circuits are stopped.

When the response probability parameter is more than the generated random number in step S2-5, the process unit 152 decides not to respond and immediately shifts to the sleep status in step S2-10. In accordance with this, it is possible to reduce unnecessary power consumption.

When the response information from the electronic shelf label 113 is received in step S2-9, the relay device 112 obtains the ID of the unregistered electronic shelf label 113 included in the response information, transmits a call to the electronic shelf label 113 having the obtained ID, and transmits ID assignment information to the unregistered electronic shelf label 113.

As mentioned above, according to the present example, the relay device 112 sets the response probability and transmits the beacon for calling including the response probability and the electronic shelf label 113 receives the beacon for calling, extracts the response probability included in the beacon for calling, and makes a response in accordance with the response probability, so that it is possible to prevent collision of responses from plural electronic shelf labels 113 to the relay device 112.

In this case, in the present example, when response is decided, a communication slot for transmitting the response is determined in a random manner, so that it is possible to further reduce the probability of collision of responses, thereby enabling efficient communication.

Moreover, plural electronic shelf labels 113 are capable of certainly returning a response to the call from the relay device 112 without error, so that it is possible to reduce unnecessary calls and responses, thereby reducing power consumption.

The present invention is not limited to the specifically disclosed embodiment, and variations and modifications may be made without departing from the scope of the present invention.

The present application is based on Japanese priority application No. 2006-038664 filed Feb. 15, 2006, the entire contents of which are hereby incorporated herein by reference.

What is claimed is:

1. A communication method of a communication system having a base station for performing a call and a terminal for returning a response to the call from the base station, the communication method comprising the steps of:
    transmitting the call by the base station, the call including response probability;
    setting a contended access period including a plurality of communication slots by the terminal after the call is transmitted;
    generating a random number by the terminal;
    deciding whether to respond to the base station by the terminal based on a comparison between the random number and the response probability when the call from the base station is received;
    randomly selecting one of the plural communication slots by the terminal; and
    responding to the base station at a timing corresponding to one of the randomly selected communication slots by the terminal when the call from the base station is received;
    shifting the terminal to a sleep status in a case where the response probability is less than the generated random number;
    wherein only minimum necessary circuits in the terminal are in operation, and operation of unnecessary circuits in the terminal are stopped when the terminal is in the sleep status.

2. A communication system comprising:
    a base station for performing a call; and
    a terminal for returning a response to the call from the base station,
    wherein the base station transmits the call including response probability, and
    the terminal is configured to set a contended access period including a plurality of communication slots after the call is transmitted, generates a random number, decides whether to respond to the base station based on a comparison between the random number and the response probability when the call from the base station is received, randomly selects one of the plural communication slots by the terminal, makes a response to the base station at a timing corresponding to one of the randomly selected communication slots based when the terminal receives the call from the base station,
    wherein the terminal shifts to a sleep status in a case where the response probability is less than the generated random number, and
    wherein only minimum necessary circuits in the terminal are in operation, and operation of unnecessary circuits in the terminal are stopped when the terminal is in the sleep status.

3. A communication apparatus for returning a response to a call from a base station, the communication apparatus comprising:
    a response decision unit deciding whether to make a response to the base station based on response probability included in the call, wherein the response decision unit is configured to set a contended access period including a plurality of communication slots after the call is transmitted, generates a random number, decides whether to respond to the base station based on a comparison between the random number and the response probability when the call from the base station is received, and randomly selects one of the plural communication slots; and
    a response unit returning a response to the base station at a timing corresponding to one of the randomly selected communication slots based on a decision by the response decision unit,
    wherein the communication apparatus shifts to a sleep status in a case where the response probability is less than the generated random number,
    wherein only minimum necessary circuits in the communication apparatus are in operation, and operation of unnecessary circuits in the communication apparatus are stopped when the communication unit is in the sleep status.

* * * * *